United States Patent
Chik et al.

(10) Patent No.: US 10,158,303 B2
(45) Date of Patent: Dec. 18, 2018

(54) METHODS AND APPARATUS TO PERFORM TORQUE BALANCE CONTROL OF CO-SHAFTED MOTORS

(71) Applicant: The Boeing Company, Chicago, IL (US)

(72) Inventors: Mun Shin Chik, St. Louis, MO (US); Darren Paschedag, St. Louis, MO (US); Neil Pande, St. Louis, MO (US); Shengyi Liu, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 11 days.

(21) Appl. No.: 15/266,773

(22) Filed: Sep. 15, 2016

(65) Prior Publication Data

US 2018/0076743 A1    Mar. 15, 2018

(51) Int. Cl.
| | |
|---|---|
| *H02P 5/74* | (2006.01) |
| *H02P 21/18* | (2016.01) |
| *H02P 5/747* | (2006.01) |
| *H02P 6/182* | (2016.01) |
| *H02P 21/13* | (2006.01) |

(52) U.S. Cl.
CPC ............ *H02P 5/74* (2013.01); *H02P 5/747* (2013.01); *H02P 6/182* (2013.01); *H02P 21/13* (2013.01); *H02P 21/18* (2016.02)

(58) Field of Classification Search
CPC .................................. H02P 5/74; H02P 27/08
USPC ........................................................ 318/434
See application file for complete search history.

(56) References Cited

U.S. PATENT DOCUMENTS

| | | | | |
|---|---|---|---|---|
| 6,018,694 A | * | 1/2000 | Egami ............... | B60K 6/24 |
| | | | | 180/65.23 |
| 6,269,290 B1 | * | 7/2001 | Egami ............... | B60K 6/26 |
| | | | | 701/22 |
| 6,904,813 B2 | * | 6/2005 | Zaremba ........... | B60K 6/48 |
| | | | | 73/862.193 |
| 2008/0294313 A1 | * | 11/2008 | Aoki ................. | B62D 5/0463 |
| | | | | 701/43 |
| 2012/0239237 A1 | * | 9/2012 | Hashimoto ........ | B60K 6/365 |
| | | | | 701/22 |
| 2013/0035833 A1 | * | 2/2013 | Nozu ................. | B60K 17/35 |
| | | | | 701/69 |

(Continued)

*Primary Examiner* — Eduardo Colon Santana
*Assistant Examiner* — Devon Joseph
(74) *Attorney, Agent, or Firm* — Hanley, Flight and Zimmerman, LLC

(57) ABSTRACT

Methods, apparatus, systems and articles of manufacture to perform torque balance control of co-shafted motors are disclosed. An example method includes calculating a first torque value based on first phase currents of a first motor that is driving a shaft connected to a control surface, and calculating a second torque value based on second phase currents of a second motor that is driving the same shaft. The example method also includes determining a first shared torque value based on the first calculated torque value and a first sharing factor, and determining a second shared torque value based on the second calculated torque value and a second sharing factor. The example method also includes determining a torque error based on the first shared torque value and the second shared torque value, and determining a first torque adjustment associated with the first motor based on the torque error.

19 Claims, 6 Drawing Sheets

(56) References Cited

U.S. PATENT DOCUMENTS

| | | | | |
|---|---|---|---|---|
| 2013/0193895 A1* | 8/2013 | Noguchi | ............... | H02P 29/022 318/490 |
| 2013/0241445 A1* | 9/2013 | Tang | ................... | B60L 15/2036 318/52 |
| 2013/0307329 A1* | 11/2013 | Ito | ......................... | B60K 6/445 307/10.1 |
| 2013/0311042 A1* | 11/2013 | Oblizajek | ............ | B62D 5/0457 701/41 |
| 2014/0288703 A1* | 9/2014 | Takagi | ................... | B25J 9/1633 700/245 |
| 2015/0013443 A1* | 1/2015 | Kanke | ................. | G01M 13/025 73/115.01 |
| 2015/0288310 A1* | 10/2015 | Pace | ........................ | H02P 6/08 318/400.02 |
| 2015/0372628 A1* | 12/2015 | Oono | ..................... | B60L 15/20 318/801 |
| 2016/0140264 A1* | 5/2016 | Miura | ..................... | H02P 29/00 703/2 |
| 2016/0297303 A1* | 10/2016 | Sawada | ..................... | B60L 7/14 |
| 2016/0297321 A1* | 10/2016 | Komatsu | ................... | B60L 7/14 |
| 2016/0347202 A1* | 12/2016 | Sawada | ................... | B60L 15/20 |
| 2017/0144651 A1* | 5/2017 | Park | ....................... | B60W 20/15 |
| 2017/0219029 A1* | 8/2017 | Shiozaki | ............... | F16D 48/066 |

\* cited by examiner

METHODS AND APPARATUS TO PERFORM TORQUE BALANCE CONTROL OF CO-SHAFTED MOTORS

FIELD OF THE DISCLOSURE

This disclosure relates generally to control systems and, more particularly, to methods and apparatus to perform torque balance control of co-shafted motors.

BACKGROUND

Torque imbalance may occur when independent motors operate on the same control surface. Motors (e.g., actuators) providing uncoordinated amounts of torque may lead to erratic control surface behavior, damage to the control surface, higher power draw due to the need of one motor to overcome another, etc.

SUMMARY

An example method includes calculating, by executing an instruction with a processor, a first torque value based on first phase currents of a first motor that is driving a shaft connected to a control surface, and calculating, by executing an instruction with the processor, a second torque value based on second phase currents of a second motor that is driving the same shaft. The example method also includes determining, by executing an instruction with the processor, a first shared torque value based on the first calculated torque value and a first sharing factor, and determining, by executing an instruction with the processor, a second shared torque value based on the second calculated torque value and a second sharing factor. The example method also includes determining, by executing an instruction with the processor, a torque error based on the first shared torque value and the second shared torque value, and determining, by executing an instruction with the processor, a first torque adjustment associated with the first motor based on the torque error.

An example apparatus includes a processor system and a memory communicatively coupled to the processor system, the memory includes instructions stored thereon that enable the processor system to calculate a first torque value based on first phase currents of a first motor that is driving a shaft connected to a control surface, calculate a second torque value based on second phase currents of a second motor that is driving the same shaft, determine a first shared torque value based on the first calculated torque value and a first sharing factor, determine a second shared torque value based on the second calculated torque value and a second sharing factor, determine a torque error based on the first shared torque value and the second shared torque value, and determine a first torque adjustment associated with the first motor based on the torque error.

An example tangible machine-readable storage medium has instructions stored thereon that, when executed, cause a machine to at least calculate a first torque value based on first phase currents of a first motor that is driving a shaft connected to a control surface, calculate a second torque value based on second phase currents of a second motor that is driving the same shaft, determine first shared torque value based on the first calculated torque value and a first sharing factor, determine a second shared torque value based on the second calculated torque value and a second sharing factor, determine a torque error based on the first shared torque value and the second shared torque value, and determine a first torque adjustment associated with the first motor based on the torque error.

BRIEF DESCRIPTION OF THE DRAWINGS

Wherever possible, the same reference numbers will be used throughout the drawing(s) and accompanying written description to refer to the same or like parts.

As used herein, the prefix "first," "second," etc. are used as labels to assist in differentiating the corresponding components. The labels are not intended to imply an order of events (e.g., a sequence), unless specified.

DETAILED DESCRIPTION

Examples disclosed herein facilitate correcting for torque imbalance between co-shafted motors connected to a common control surface. Torque imbalance may occur when, for example, a first motor of the co-shafted motors is applying a first torque to the common control surface and a second motor of the co-shafted motors is applying a second torque, that is different than the first torque, to the common control surface. In such instances (e.g., where torque imbalance occurs), damage may be done to the control surface and/or the motors. Additionally, power loss may occur due to one motor having to overcome the torque load of the other motor.

Disclosed examples include a torque balancing engine to correct for torque imbalance between co-shafted motors. For example, disclosed examples include determining a first percentage of a torque load applied by the first motor and a second percentage of the torque load applied by the second motor. In some examples, the torque balancing engine compares the torques applied by the two motors and determines if a torque error exists (e.g., a torque imbalance occurs). If a torque error is detected, the example torque balancing engine determines torque adjustments to apply to each respective torque load to correct for the torque imbalance.

Figure 1:
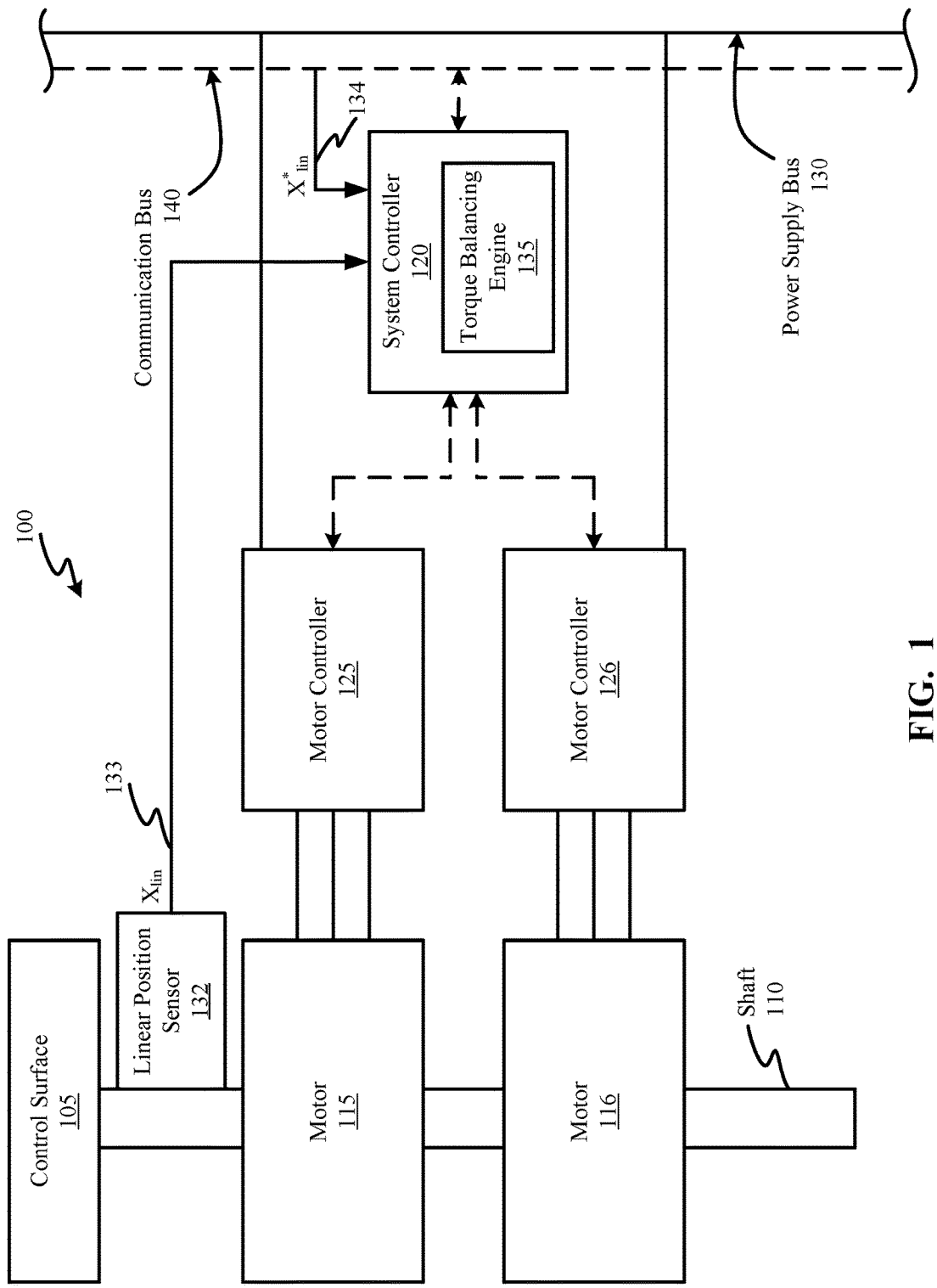
FIG. 1 is a block diagram of an example control system within which the teachings of this disclosure may be implemented.

FIG. 1 is a block diagram of an example control system 100 to control an example control surface 105. The example control surface 105 of FIG. 1 is a flight control surface (e.g., a landing gear, a door, etc.) that is connected to a rotating shaft 110. However, other types of control surfaces may additionally or alternatively be used. In the illustrated example of FIG. 1, the shaft 110 is driven by two motors 115, 116. The example shaft 110 translates rotational movement of the motors 115, 116 to linear motion that controls the example control surface 105. For example, the shaft 110 may be coupled to the control surface 105 via a ball screw or a rack and pinion. However, other techniques for moving the control surface 105 may additionally or alternatively be used.

In the illustrated example, the first motor 115 and the second motor 116 are permanent magnet synchronous machines (PMSMs). However, in other implementations, the first motor 115 and/or the second motor 116 may be implemented using any suitable type of motor such as an AC motor, a variable frequency motor, a DC motor, a stepper motor, a servo motor, etc.

In the illustrated example of FIG. 1, the example control system 100 includes a system controller 120 to control the torque of the first motor 115 and the second motor 116. The example system controller 120 of FIG. 1 is communicatively coupled to a first motor controller 125 to control the torque of the first motor 115 and to a second motor controller 126 to control the torque of the second motor 116. The example motor controllers 125, 126 are also coupled to a power supply bus 130 to receive power for controlling the torque of the corresponding motors 115, 116.

In the illustrated example, the shaft 110 is coupled to a linear position sensor 132. The example linear position sensor 132 measures a linear position ($X_{lin}$) 133 of the shaft 110. The linear position sensor 132 of FIG. 1 provides the measured linear position ($X_{lin}$) 133 to the system controller 120. However, in some implementations, the control system 100 may not include the linear position sensor 132. For example, the system controller 120 may estimate the linear position of the shaft 110 based on, for example, a rotational position of the motors 115, 116.

In the illustrated example of FIG. 1, the system controller 120 includes an example torque balancing engine 135 to control torque imbalance between the co-shafted motors 115, 116 connected to the common control surface 105 via the shaft 110. As discussed in greater detail below, the torque balancing engine 135 processes torque readings from the motors 115, 116 and determines respective torque adjustment values to apply to corresponding target torque values.

During operation, the example system controller 120 periodically samples the components of the example control system 100. For example, the system controller 120 may poll the linear position sensor 132 for the measured linear position ($X_{lin}$) 113 of the shaft 110. The example control system 120 also receives a target linear position ($X_{lin}$*) 134 via an example communication bus 140. The example target linear position ($X_{lin}$*) 134 corresponds to a target linear position of the shaft 110. The system controller 120 compares the target linear position ($X_{lin}$*) 134 to a determined linear position ($X_{lin}\tilde{\phantom{x}}$) (e.g., the measured linear position ($X_{lin}$) 133 and/or an estimated linear position) of the shaft 110 and determines target torque values ($T_{target}$) to provide to the respective motor controllers 125, 126. The example torque balancing engine 135 obtains calculated torque values ($T_{calculated}$) from the respective motors 115, 116 and determines respective torque adjustment values ($T_{adj}$) to apply to the corresponding target torque values ($T_{target}$). The example system controller 120 of FIG. 1 then provides the adjusted target torque values ($T_e$*) (sometimes referred to herein as "torque command values" or "torque reference values") to the respective motor controllers 125, 126 to control the torques of the corresponding motors 115, 116.

In the illustrated example, including the torque balancing engine 135 in the example control system 100 enables mitigating torque discrepancies found in systems operating co-shafted motors. For example, the torque balancing engine 135 of FIG. 1 enables preventing damage to the control surface 105 and/or the motors 115, 116 due to, for example, torque mismatch. The example torque balancing engine 135 of FIG. 1 also increases the efficiency of the control system 100 as a whole by reducing power loss from, for example, the first motor 115 having to overcome the second motor 116.

Figure 2:
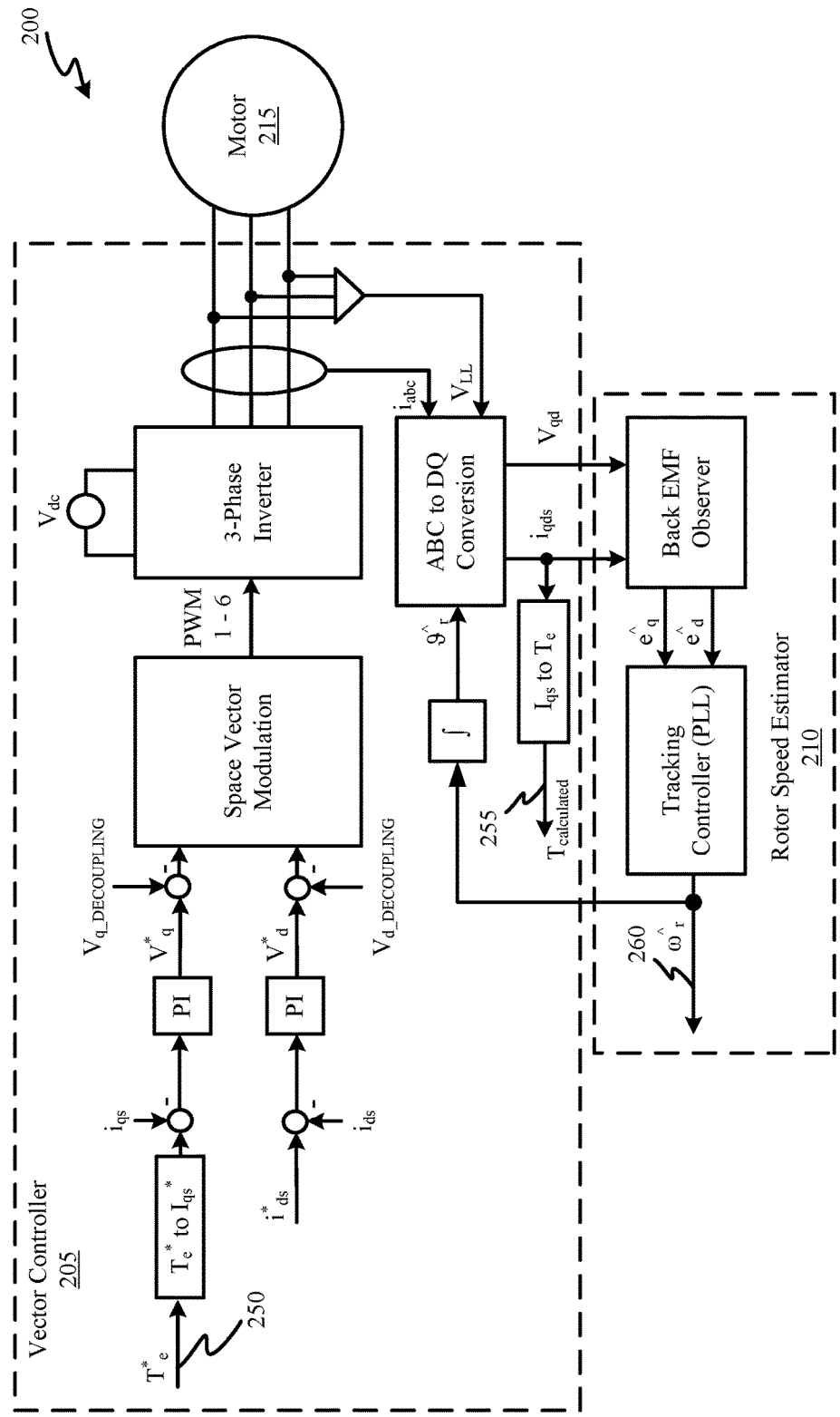
FIG. 2 is a block diagram of an example implementation of an example motor controller of FIG. 1.

FIG. 2 is a block diagram of an example motor controller 200. The example motor controller 200 of FIG. 2 may be used to implement the example motor controllers 125, 126 of FIG. 1. The operation of the motor controller 200 of FIG. 2 is well-known and not described in detail here for brevity. The example motor controller 200 includes an example vector controller 205 and an example rotor speed estimator 210 in communication with an example motor 215. The example motor 215 of FIG. 2 may be used to implement the example motors 115, 116 of FIG. 1.

In the illustrated example of FIG. 2, the vector controller 205 receives as input a torque command value ($T_e$*) 250 that specifies the torque to be provided by the respective motor 215 connected to the corresponding motor controller 200. As described below in connection with FIG. 3, the torque command value ($T_e$*) 250 is provided by the system controller 120 of FIG. 1. The vector controller 205 processes the torque command value ($T_e$*) 250 and outputs pulse-width modulation (PWM) signals. In the illustrated example, the PWM signals drive an inverter, which provides phase currents to the motor 215. The phase currents are also used by the example vector controller 205 to calculate a torque value ($T_{calculated}$) 255. The calculated torque value ($T_{calculated}$) 255 represents the torque being provided by the motor 215. In some implementations, the motor controller 200 may include a sensor (or sensors) to measure the torque and/or speed being provided by the motor 215. For example, a torque sensor may be implemented using rotary strain gauges, torque transducers, rotary torque sensors, torque meters, etc. A speed sensor may be implemented using an encoder, a hall effect sensor, etc.

In the illustrated example of FIG. 2, the rotor speed estimator 210 estimates a rotor speed ($w_r\tilde{\phantom{x}}$) 260 of the motor 215. In other examples, the rotor speed and/or an angular position of the shaft 110 may be measured using additional or alternate techniques such as a sensor. The estimated rotor speed ($w_r\tilde{\phantom{x}}$) 260 is used by the example system controller 120 to determine the target torque values ($T_{target}$) to provide to the corresponding motor controller 200.

Figure 3:
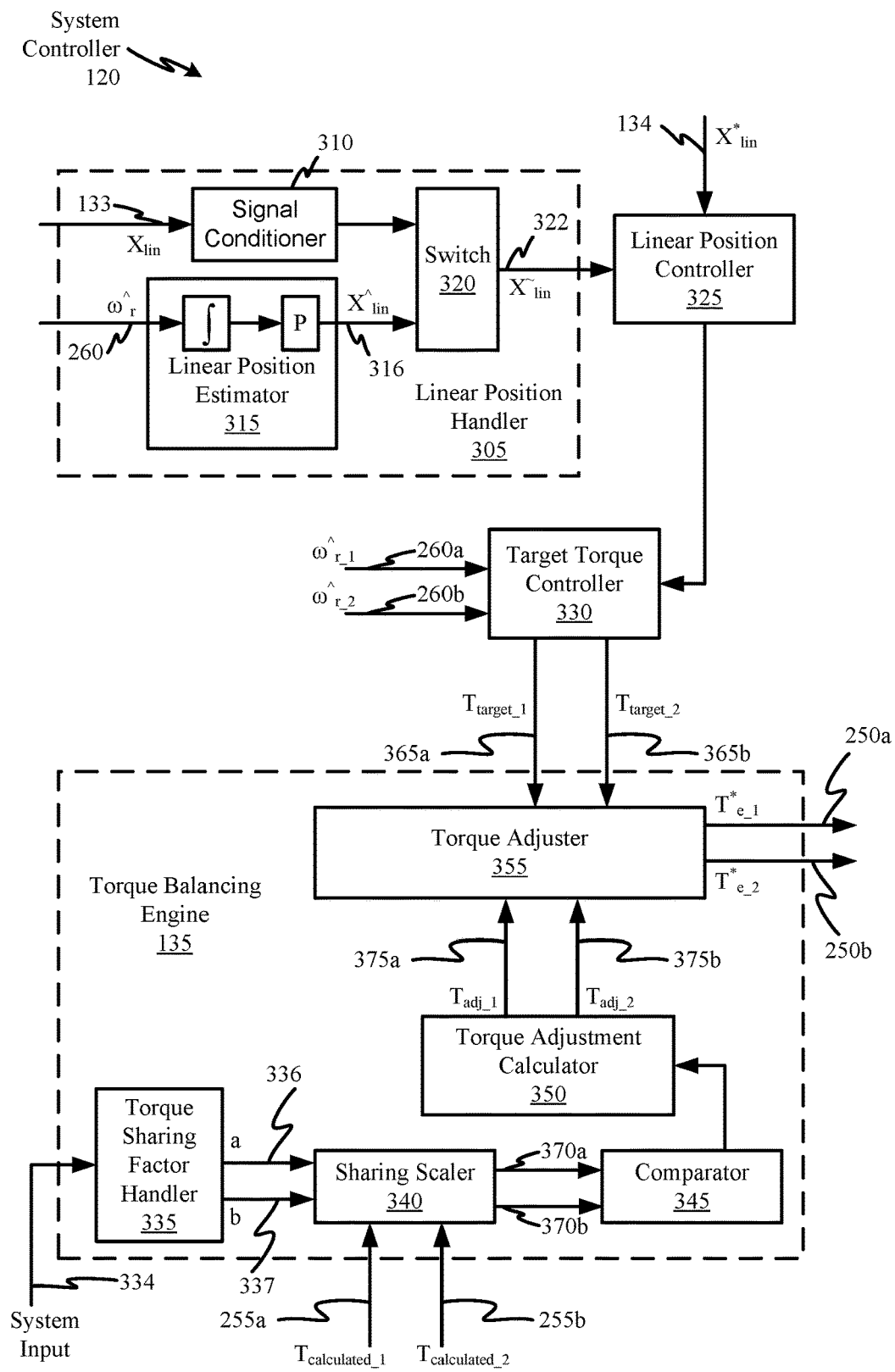
FIG. 3 is a block diagram of an example implementation of an example system controller of FIG. 1.

FIG. 3 is a block diagram of an example implementation of the system controller 120 of FIG. 1. The example system controller 120 generates a first torque command value ($T_{e\_1}$*) 250a to provide to the first motor controller 125 of FIG. 1 and a second torque command value ($T_{e\_2}$*) 250b to provide to the second motor controller 126 of FIG. 1. The example system controller 120 of FIG. 3 includes an example linear position handler 305, an example linear position controller 325, an example target torque controller 330 and the example torque balancing engine 135 of FIG. 1.

In the illustrated example of FIG. 3, the example system controller 120 includes the linear position handler 305 to provide a determined linear position ($X_{lin}\tilde{\phantom{x}}$) 322 of the shaft 110. In some examples, the linear position handler 305 uses the measured linear position ($X_{lin}$) 133 provided by the linear position sensor 132 to generate the determined linear position ($X_{lin}\tilde{\phantom{x}}$) 322. In some such instances, the example linear position handler 305 may include a signal conditioner 310 to process the measured linear position ($X_{lin}$) 133.

In some examples, the linear position handler 305 estimates a linear position ($X_{lin}\hat{\phantom{x}}$) 316 based on an estimated rotational speed value. For example, the linear position handler 305 may obtain the estimated rotational speed value $(\hat{w_r})$ 260 from the example rotor speed estimator 210. The example linear position handler 305 provides the estimated rotational speed value $(\hat{w_r})$ 260 to an example linear position estimator 315 to estimate the linear position $(\hat{X_{lin}})$ 316 of the shaft 110. In the illustrated example of FIG. 3, the linear position estimator 315 includes a proportional-integrator to estimate the linear position $(\hat{X_{lin}})$ 316. However, other techniques for estimating the linear position $(\hat{X_{lin}})$ 316 may additionally or alternatively be used.

In the illustrated example of FIG. 3, the example linear position handler 305 includes an example switch 320 to output the determined linear position $(\tilde{X_{lin}})$ 322. For example, the example switch 320 may receive the measured linear position $(X_{lin})$ 133 and/or the estimated linear position $(\hat{X_{lin}})$ 316 and select one of the linear position values. In some examples, if the switch 320 receives a measured linear position $(X_{lin})$ 133, the switch 320 uses the measured linear position $(X_{lin})$ 133 as the determined linear position $(\tilde{X_{lin}})$ 322. In other instances where the switch 320 does not receive a measured linear position $(X_{lin})$ 133, the example switch 320 uses the estimated linear position $(X_{lin})$ 133 as the determined linear position $(\tilde{X_{lin}})$ 322.

In the illustrated example of FIG. 3, the example system controller 120 includes the linear position controller 325 to generate a target rotational speed $(w_r^*)$ 360 based on linear position information. In the illustrated example of FIG. 3, the linear position controller 325 is implemented by a proportional-integral (PI) controller. The example linear position controller 305 obtains the target linear position $(X_{lin}^*)$ 134 via the communication bus 140 of FIG. 1 and obtains the determined linear position $(\tilde{X_{lin}})$ 322 of the shaft 110 from the linear position handler 305. In the illustrated example, the linear position controller 325 compares the target linear position $(X_{lin}^*)$ 134 to the determined linear position $(\tilde{X_{lin}})$ 322 and generates the target rotational speed $(w_r^*)$ 360.

In the illustrated example of FIG. 3, the example system controller 120 includes the example target torque controller 330 to generate target torque values based on rotational speed information. In the illustrated example of FIG. 3, the target torque controller 330 is implemented by a proportional-integral (PI) controller. In the illustrated example, the target torque controller 330 obtains the target rotational speed $(w_r^*)$ 360 from the linear position controller 325. The example target torque controller 310 also obtains the estimated rotational speed values $(\hat{w_r})$ 260 from the motor controller 200 of FIG. 2. For example, the target torque controller 330 may obtain a first estimated rotational speed value $(\hat{w_{r\_1}})$ 260a from the first motor controller 125 and may obtain a second estimated rotational speed value $(\hat{w_{r\_2}})$ 260b from the second motor controller 126. In the illustrated example, the rotational speed values $(\hat{w_{r\_1}})$ 260a, $(\hat{w_{r\_2}})$ 260b obtained from the respective motor controllers 125, 126 are estimated values. However, other techniques for obtaining the rotational speed values $(\hat{w_{r\_1}})$ 260a, $(\hat{w_{r\_2}})$ 260b of the corresponding motors 115, 116 may additionally or alternatively be used. For example, the rotational speed values $(\hat{w_{r\_1}})$ 260a, $(\hat{w_{r\_2}})$ 260b may be obtained via sensors coupled to the motors 115, 116 and/or the motor controllers 125, 126.

The example target torque controller 330 of FIG. 3 compares the respective estimated rotational speed values $(\hat{w_r})$ 260 to the target rotational speed $(w_r^*)$ 360 from the linear position controller 325 to determine target torque values 365 for the corresponding motors. For example, the target torque controller 330 may compare the first estimated rotational speed value $(\hat{w_{r\_1}})$ 260a to the target rotational speed $(w_r^*)$ 360 and generate a first target torque value $(T_{target\_1})$ 365a for the first motor 115. The example target torque controller 310 compares the second estimated rotational speed value $(\hat{w_{r\_2}})$ 260b to the target rotational speed $(w_r^*)$ 360 and generates a second target torque value $(T_{target\_2})$ 365b for the second motor 116. In some examples, the first and second estimated rotational speed values $(\hat{w_{r\_1}})$ 260a, $(\hat{w_{r\_2}})$ 260b may be the same value because they are associated with co-shafted motors.

As discussed above, in some instances, the torque being applied by co-shafted motors (e.g., the first motor 115 and the second motor 116 of FIG. 1) may result in a torque imbalance being applied to the shaft. Referring to the example control system 100 of FIG. 1, torque imbalance may result in damage to the example shaft 110 being driven by the motors 115, 116, the example control surface 105 being controlled by the shaft 110 and/or one or both of the motors 115, 116. Additionally or alternatively, the torque imbalance may result in inefficient power consumption by the control system 100 as, for example, the first motor 115 may have to overcome the load of the second motor 116.

To correct potential torque imbalance, the example system controller 120 of FIG. 3 includes the torque balancing engine 135. In the illustrated example of FIG. 3, the torque balancing engine 135 includes an example torque sharing factor handler 335, an example sharing scaler 340, an example comparator 345, an example torque adjustment calculator 350 and an example torque adjuster 355.

In the illustrated example of FIG. 3, the example torque balancing engine 135 includes the torque sharing factor handler 335 to provide a first sharing factor (a) 336 corresponding to the first motor 115 and a second sharing factor (b) 337 corresponding to the second motor 116. In the illustrated example of FIG. 3, the sharing factors (a) 336, (b) 337 represent a share (e.g., a percentage) of the torque load each motor 115, 116 contributes. The sharing factors (a) 336, (b) 337 are used by the example sharing scaler 340 to determine shared torque values 370a, 370b. In the illustrated example of FIG. 3, the torque sharing factor handler 335 generates the sharing factors (a) 336, (b) 337 based on a system input 334. In some examples, the system input 334 is user input. For example, a user may provide, via a user interface, values for the sharing factors (a) 336, (b) 337. In some examples, the system input 334 is system information. For example, the system input 334 may include information corresponding to the sizes of the respective motors 115, 116. In some such examples, the torque sharing factor handler 335 may generate the sharing factors (a) 336, (b) 337 based on the respective sizes of the first motor 115 and the second motor 116. In general, if the first motor 115 and the second motor 116 are providing the same output, the sharing factors (a) 336, (b) 337 may be represented as a one-to-one ratio (e.g., 1:1). However, other techniques for generating the sharing factors (a) 336, (b) 337 may additionally or alternatively be used.

In the illustrated example of FIG. 3, the example torque balancing engine 135 includes the sharing scaler 340 to scale an input by a sharing factor. In the illustrated example, the sharing scaler 340 obtains the example calculated torque value (T calculated) 255 from the example vector controller 205 of the motor controller 200 and obtains the sharing factors (a) 336, (b) 337 from the example torque sharing factor handler 335. The example sharing scaler 340 then multiplies (1) the calculated torque value $(T_{calculated})$ 255 for a corresponding motor and (2) the sharing factor for the corresponding motor to determine a shared torque value. In the illustrated example, the shared torque value represents a portion of the torque being applied by the corresponding motor. For example, the sharing scaler 340 scales (1) a first calculated torque value ($T_{calculated\_1}$) 255a from the first motor controller 115 by (2) the first sharing factor (a) 336 to determine a first shared torque value 370a. Similarly, the example sharing scaler 340 scales (1) a second calculated torque value ($T_{calculated\_2}$) 255b obtained from the second motor controller 116 by (2) the second sharing factor (b) 337 to determine a second shared torque value 370b.

In the illustrated example of FIG. 3, the example torque balancing engine 135 includes the example comparator 345 to determine which, if any, motor is providing extra torque that may result in a torque imbalance. For example, the comparator 345 compares the first shared torque value 370a to the second shared torque value 370b and determines which shared torque value is greater. The example comparator 345 of FIG. 3 provides the output of the comparison to the example torque adjustment calculator 350. In some examples, the comparator 345 outputs a positive (+) indicator, a negative (−) indicator or a no difference (0) indicator to the torque adjustment calculator 350. For example, if the first shared torque value 370a is greater than the second shared torque value 370b, the comparator 345 may output a positive indicator to the torque adjustment calculator 350. In some examples, the comparator 345 may provide the torque adjustment calculator 350 a value representative of the difference between the two shared torque values 370a, 370b (e.g., a torque error). For example, if the first shared torque value 370a is one newton-meter (1 N-m) less than the second shared torque value 370b, the comparator 345 may provide the torque adjustment calculator 350 an output representative of the difference (e.g., a torque error of negative one newton-meter (−1 N-m)).

In the illustrated example of FIG. 3, the example torque balancing engine 135 includes the example torque adjustment calculator 350 to determine a torque adjustment to apply to the respective target torque values ($T_{target}$) 365 to offset the torque imbalance (e.g., correct for the torque error). For example, in response to an indicator from the comparator 345 that the second shared torque value 370b is greater than the first shared torque value 370a, the example torque adjustment calculator 350 may calculate a first torque adjustment ($T_{adj\_1}$) 375a to modify the first target torque value ($T_{target\_1}$) 365a (e.g., increase the first target torque value 365a by one newton-meter (1 N-m)). In some such examples, the torque adjustment calculator 350 may set a second torque adjustment ($T_{adj\_2}$) 375b to zero. In some examples, the torque adjustment calculator 350 may calculate a second torque adjustment ($T_{adj\_2}$) 375b to modify the second target torque value ($T_{target\_2}$) 365b (e.g., decrease the second target torque value 365b by one newton-meter (−1 N-m)). In some such examples, the torque adjustment calculator 350 may set a first torque adjustment ($T_{adj\_1}$) 375a to zero. In other examples, the torque adjustment calculator 325 may calculate a first torque adjustment ($T_{adj\_1}$) 375a to apply to the first target torque value ($T_{target\_1}$) 365a and a second torque adjustment ($T_{adj\_2}$) 375b to apply to the second target torque value ($T_{target\_2}$) 365b (e.g., increase the first target torque value 365a by one-half newton-meter (½ N-m) and decrease the second target torque value 365b by one-half newton-meter (−½ N-m)). However, other techniques for calculating the first torque adjustment ($T_{adj\_1}$) 375a and/or the second torque adjustment ($T_{adj\_2}$) 375b to apply to the target torque values ($T_{target}$) 365 may addition-ally or alternatively be used. In some examples, the torque adjustment calculator 350 may be implemented by a proportional integral controller.

In the illustrated example of FIG. 3, the example torque balancing engine 135 includes the example torque adjuster 355 to determine the torque command values ($T_e^*$) 250 to provide to the corresponding motor controllers 125, 126. The example torque adjuster 355 of FIG. 3 modifies the respective target torque values ($T_{target}$) 365 with the corresponding torque adjustments ($T_{adj}$) 375. For example, the torque adjuster 355 may determine a first adjusted target torque value ($T_{e\_1}^*$) 250a by adding the first torque adjustment ($T_{adj\_1}$) 375a to the first target torque value ($T_{target\_1}$) 365a and may determine a second adjusted target torque value ($T_{e\_2}^*$) 250b by adding the second torque adjustment ($T_{adj\_2}$) 375b to the second target torque value ($T_{target\_2}$) 365b. However, other techniques for modifying the target torque values ($T_{target}$) 365 with the torque adjustments ($T_{adj}$) 375 may additionally or alternatively be used. The example torque adjuster 355 of FIG. 3 provides the adjusted target torque values (e.g., the example torque command values ($T_{e\_1}^*$) 250a, ($T_{e\_2}^*$) 250b) to the respective motor controllers 125, 126 to apply to the corresponding motors 115, 116.

While an example manner of implementing the system controller 120 of FIG. 1 is illustrated in FIG. 3, one or more of the elements, processes and/or devices illustrated in FIG. 3 may be combined, divided, re-arranged, omitted, eliminated and/or implemented in any other way. Further, the example torque balancing engine 135, the example linear position handler 305, the example signal conditioner 310, the example linear position estimator 315, the example switch 320, the example linear position controller 325, the example target torque controller 330, the example torque sharing factor handler 335, the example sharing scaler 340, the example comparator 345, the example torque adjustment calculator 350, the example torque adjuster 355 and/or, more generally, the example system controller 120 of FIG. 3 may be implemented by hardware, software, firmware and/or any combination of hardware, software and/or firmware. Thus, for example, any of the example torque balancing engine 135, the example linear position handler 305, the example signal conditioner 310, the example linear position estimator 315, the example switch 320, the example linear position controller 325, the example target torque controller 330, the example torque sharing factor handler 335, the example sharing scaler 340, the example comparator 345, the example torque adjustment calculator 350, the example torque adjuster 355 and/or, more generally, the example system controller 120 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example torque balancing engine 135, the example linear position handler 305, the example signal conditioner 310, the example linear position estimator 315, the example switch 320, the example linear position controller 325, the example target torque controller 330, the example torque sharing factor handler 335, the example sharing scaler 340, the example comparator 345, the example torque adjustment calculator 350, the example torque adjuster 355 and/or, more generally, the example system controller 120 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example system controller 120 of FIG. 3 may include one or more elements, processes and/or devices in addition to, or instead of, those illustrated in FIG. 3, and/or may include more than one of any or all of the illustrated elements, processes and devices.

Figure 4:
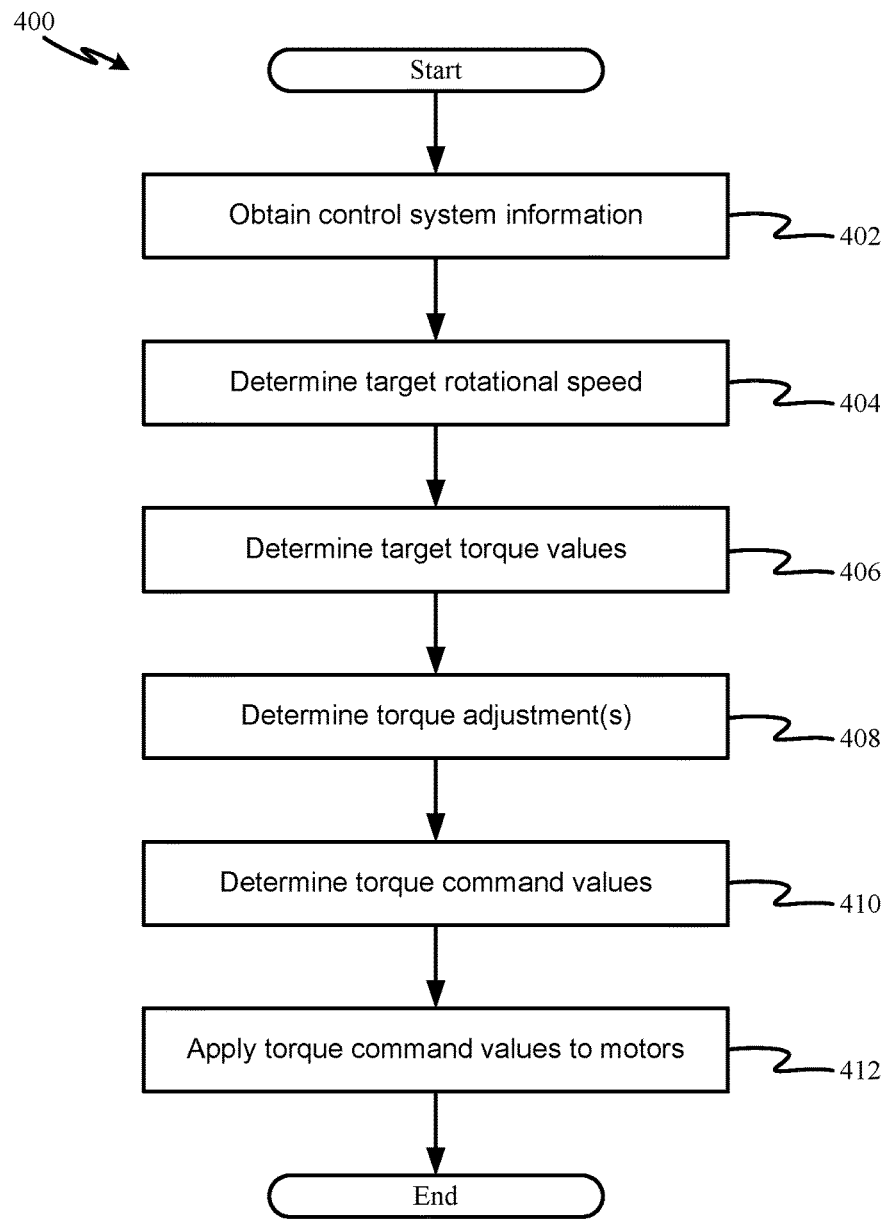
FIG. 4 is a flowchart representative of example methods that may be executed by the example system controller of FIGS. 1 and/or 3 to perform torque balance control.
Figure 5:
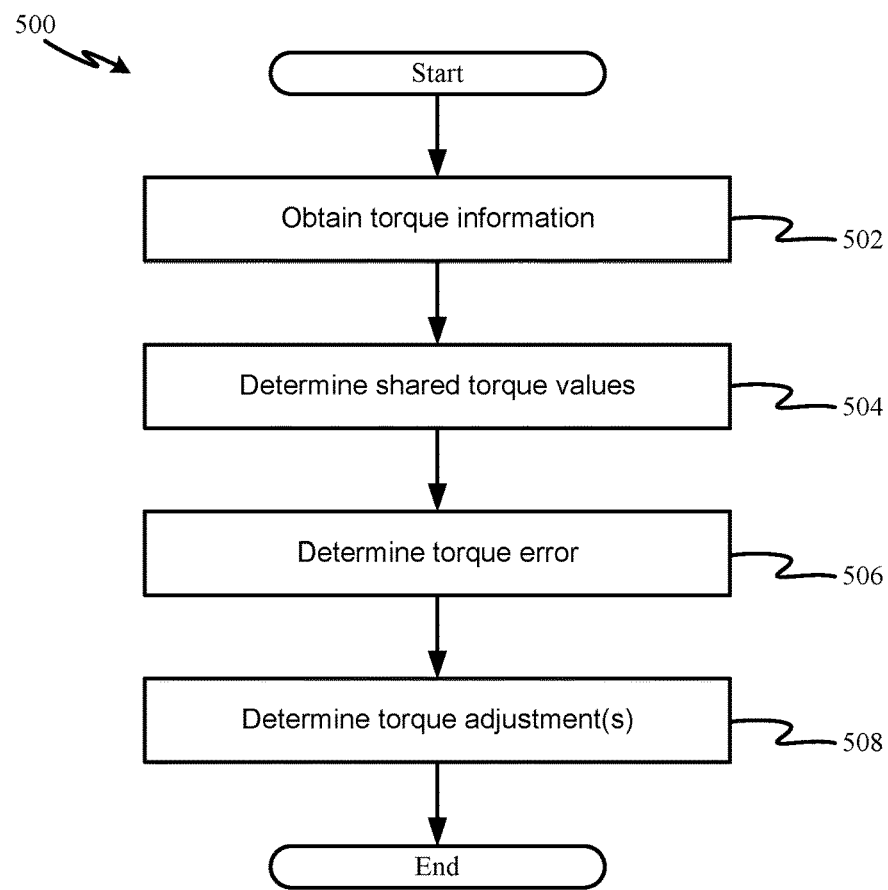
FIG. 5 is a flowchart representative of example methods that may be executed by the example torque balancing engine of FIGS. 1 and/or 3 to determine torque adjustment values.

Flowcharts representative of example methods for implementing the example system controller 120 of FIGS. 1 and/or 3 and/or the example torque balancing engine 135 of FIGS. 1 and/or 3 are shown in FIGS. 4 and 5. In these examples, the methods may be implemented using machine readable instructions comprise a program for execution by a processor such as the processor 612 shown in the example processor platform 600 discussed below in connection with FIG. 6. The program(s) may be embodied in software stored on a tangible computer readable storage medium such as a CD-ROM, a floppy disk, a hard drive, a digital versatile disk (DVD), a Blu-ray disk, or a memory associated with the processor 612, but the entire program(s) and/or parts thereof could alternatively be executed by a device other than the processor 612 and/or embodied in firmware or dedicated hardware. Further, although the example program(s) is/are described with reference to the flowcharts illustrated in FIGS. 4 and 5, many other methods of implementing the example system controller 120 may alternatively be used. For example, the order of execution of the blocks may be changed, and/or some of the blocks described may be changed, eliminated, or combined.

As mentioned above, the example methods of FIGS. 4 and/or 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4 and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term "consisting" and/or other forms of "consist" are defined to be close-ended terms.

FIG. 4 is a flowchart representative of an example method 400 that may be executed to implement the example system controller 120 of FIGS. 1 and/or 3 to perform torque balance control of co-shafted motors. The example method 400 of FIG. 4 begins at block 402 when the example system controller 120 obtains control system information. For example, the system controller 120 may sample its inputs to obtain up-to-date values of linear position information (e.g., the measured linear position ($X_{lin}$) 133 and/or the estimated linear position ($X_{lin}\hat{}$) 316) associated with the shaft 110 (FIG. 1), estimated rotational speeds (w') 260 and calculated torque values ($T_{calculated}$) 255. For example, the linear position controller 325 (FIG. 3) may obtain the target linear position ($X_{lin}$*) 134 for the shaft 110 via the communication bus 140 of FIG. 1 and may obtain the determined linear position value ($X_{lin}\tilde{}$) 322 of the shaft 110 from the linear position handler 305 (FIG. 3). At block 404, the example system controller 120 determines the target rotational speed ($w_r$*) 360 for the shaft 110. For example, the linear position controller 325 may generate the rotational speed command ($w_r$*) 360 based on the target linear position ($X_{lin}$*) 134 and the determined linear position ($X_{lin}\tilde{}$) 322.

At block 406, the example system controller 120 determines the target torque values for the respective motors 115, 116 of FIG. 1. For example, the target torque controller 330 (FIG. 3) may generate the first target torque value ($T_{target\_1}$) 365a based on the first estimated rotational speed value ($w_{r\_1}\hat{}$) 260a from the first motor controller 125 and the target rotational speed ($w_r$*) 360. The example target torque controller 310 also generates the second target torque value ($T_{target\_2}$) 365b based on the second estimated rotational speed value ($w_{r\_2}\hat{}$) 260b from the second motor controller 125 and the target rotational speed ($w_r$*) 360.

At block 408, the example system controller 120 determines one or more torque adjustment(s). For example, the example torque balancing engine 135 (FIGS. 1 and/or 3) may compare a portion of the first calculated torque value ($T_{calculated\_1}$) 255a to a portion of the second calculated torque value ($T_{calculated\_2}$) 255b and determine a torque adjustment ($T_{adj}$) 375 to apply a target torque value ($T_{target}$) 365. In some examples, the torque balancing engine 135 may determine the first torque adjustment ($T_{adj\_1}$) 375a to apply to the first target torque value ($T_{target\_1}$) 365a and/or may determine the second torque adjustment ($T_{adj\_2}$) 375b to apply to the second target torque value ($T_{target\_2}$) 365b.

At block 410, the example system controller 120 determines the corresponding torque command values ($T_e$*) 250 to provide to the respective motor controllers 125, 126. For example, the example torque adjuster 355 (FIG. 3) may modify the first target torque value ($T_{target\_1}$) 365a by the first torque adjustment ($T_{adj\_1}$) 375a to determine the first torque command value ($T_{e\_1}$*) 250a to provide to the first motor controller 125. The example torque adjuster 355 may modify the second target torque value ($T_{target\_2}$) 365b by the second torque adjustment ($T_{adj\_2}$) 375b to determine the second torque command value ($T_{e\_2}$*) 250b.

At block 412, the example system controller 120 applies the torque command values ($T_{e\_1}$*) 250a, ($T_{e\_2}$*) 250b to the motors 115, 116. For example, the torque adjuster 355 may provide the first torque command value ($T_{e\_1}$*) 250a to the first motor controller 125 and may provide the second torque command value ($T_{e\_2}$*) 250b to the second motor controller 126. The example method 400 of FIG. 4 then ends. Additionally or alternatively, the example method 400 of FIG. 4 may run continuously and, thus, control may return to block 402 to obtain the control system information by polling the components of the control system 100.

FIG. 5 is a flowchart representative of an example method 500 that may be executed to implement the example torque balancing engine 135 of FIGS. 1 and/or 3 to determine one or more torque adjustment(s). The example method 500 of FIG. 5 begins at block 502 when the example torque balancing engine 135 obtains the calculated torque values ($T_{calculated}$) 255. For example, the example torque sharing factor handler 335 (FIG. 3) may output the first sharing factor (a) 336 corresponding to the first motor 115 and the second sharing factor (b) 337 corresponding to the second motor 116. In some examples, the values of the sharing factors (a) 336, (b) 337 is based on the system input 334. The example sharing scaler 340 (FIG. 3) obtains the calculated torque values ($T_{calculated}$) 255 from the respective motor controllers 125, 126.

At block 504, the example torque balancing engine 135 determines the shared torque values for the respective motors 115, 116. For example, the sharing scaler 340 calculates the first shared torque value 370a by scaling the first calculated torque value ($T_{calculated\_1}$) 255a from the first motor controller 125 with the first sharing factor (a) 336. The example sharing scaler 340 also calculates the second shared torque value 370b by scaling the second calculated torque value ($T_{calculated\_2}$) 255b from the second motor controller 126 with the second sharing factor (b) 337. In the illustrated example, the sharing scaler 315 calculates the shared torque values 370 in parallel (e.g., concurrently). However, in other implementations, the sharing scaler 315 may calculate the sharing torque values in a sequential manner.

At block 506, the example torque balancing engine 135 determines a torque error based on the shared torque values 370. For example, the example comparator 345 (FIG. 3) may compare the first shared torque value 370a to the second shared torque value 370b and determine the difference in values to be the torque error. At block 508, the example torque balancing engine 135 determines the torque adjustments ($T_{adj}$) 375 to correct for the torque error and facilitate torque balance control. For example, if the output of the comparator 345 indicates that the first motor 115 is applying more torque than the second motor 116, the example torque adjustment calculator 350 (FIG. 3) may calculate the first torque adjustment ($T_{adj\_1}$) 375a to modify the first target torque value ($T_{target\_1}$) 365a so that the torque applied by the first motor 115 matches the torque applied by the second motor 116. In some examples, the torque adjustment calculator 350 may calculate the second torque adjustment ($T_{adj\_2}$) 375b to modify the second target torque value ($T_{target\_2}$) 365b so that the torque applied by the second motor 116 matches the torque applied by the first motor 115. In some examples, the torque adjustment calculator 350 may calculate the first torque adjustment ($T_{adj\_1}$) 375a and the second torque adjustment ($T_{adj\_2}$) 375b to modify the first target torque value ($T_{target\_1}$) 365a and the second target torque value ($T_{target\_2}$) 365b, respectively. The example method 500 of FIG. 5 then ends. Additionally or alternatively, the example method 500 of FIG. 5 may run continuously and, thus, control may return to block 502 to determine the first shared torque value 370a.

Figure 6:
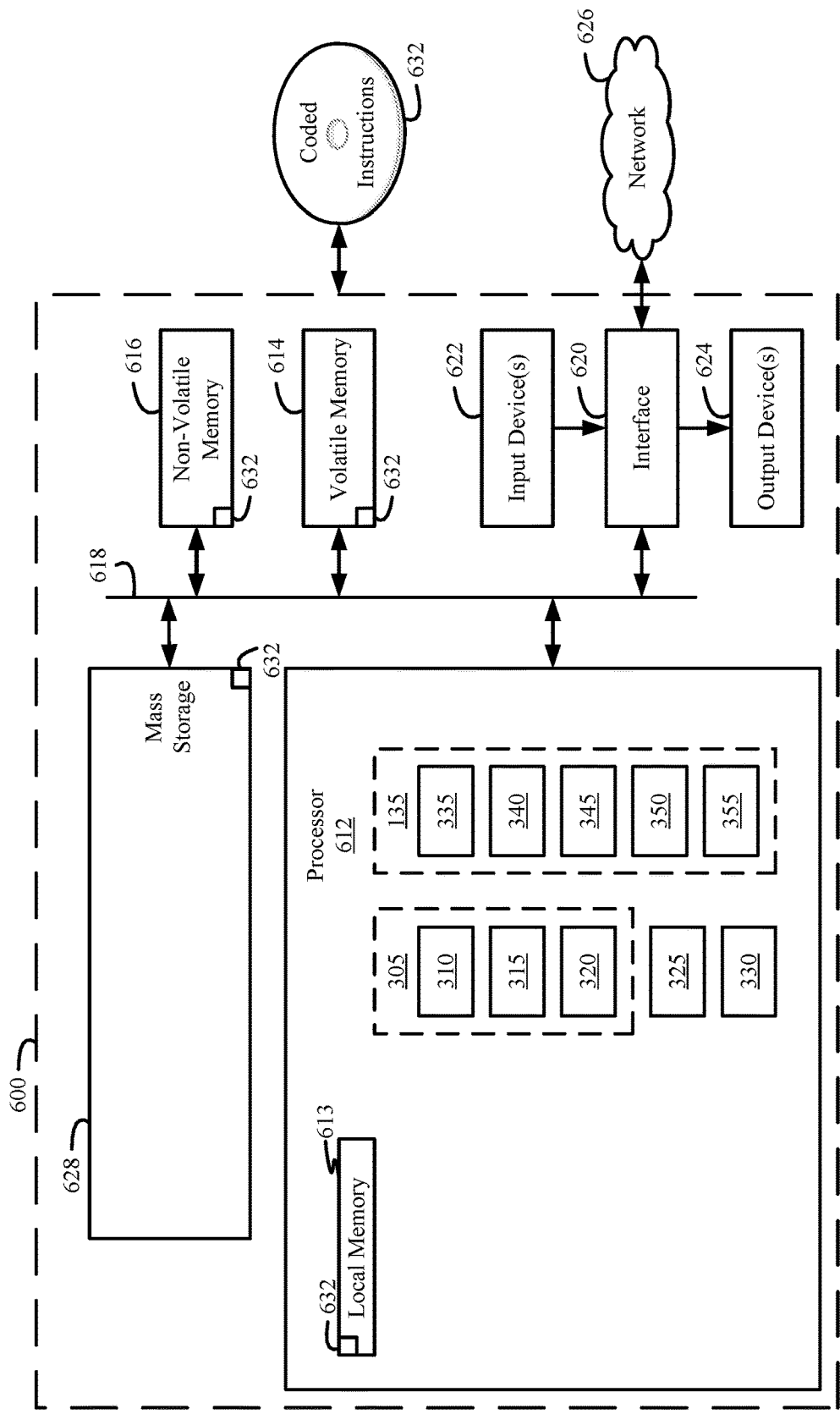
FIG. 6 is a block diagram of an example processing platform structured to execute machine-readable instructions to implement the methods of FIGS. 4 and/or 5 and/or the example system controller of FIGS. 1 and/or 3.

FIG. 6 is a block diagram of an example processor platform 600 capable of executing instructions to implement the methods of FIGS. 4 and/or 5 and the system controller 120 of FIGS. 1 and/or 3. The processor platform 600 can be, for example, a server, a personal computer, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example executes the instructions to implement the example torque balancing engine 135, the example linear position handler 305, the example signal conditioner 310, the example linear position estimator 315, the example switch 320, the example linear position controller 325, the example target torque controller 330, the example torque sharing factor handler 335, the example sharing scaler 340, the example comparator 345, the example torque adjustment calculator 350 and the example torque adjuster 355. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 to implement the methods of FIGS. 4 and/or 5 may be stored in the mass storage device

628, in the volatile memory 614, in the non-volatile memory 616, and/or on a removable tangible computer readable storage medium such as a CD or DVD.

From the foregoing, it will be appreciated that the above disclosed methods, apparatus and articles of manufacture facilitate torque balance control of co-shafted motors. For example, disclosed examples may determine torque adjustment values to modify target torque values of each of the co-shafted motors. By applying the torque adjustments to the target torque values, disclosed examples prevent damage to the control surface and the motors. Additionally, the disclosed examples enable increased efficiency of the control system by reducing power loss from one motor having to overcome the other motor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   measuring, by a linear position sensor, a linear position of a shaft connected to an aerodynamic control surface;
   calculating, by executing an instruction with a processor, a first torque value based on first phase currents of a first motor that is directly coupled to the shaft;
   calculating, by executing an instruction with the processor, a second torque value based on second phase currents of a second motor co-shafted onto the shaft with the first motor;
   determining, by executing an instruction with the processor, a target linear position of the shaft based on the measured linear position;
   determining, by executing an instruction with the processor, a first shared torque value based on the first calculated torque value and a first sharing factor associated with the first motor;
   determining, by executing an instruction with the processor, a second shared torque value based on the second calculated torque value and a second sharing factor associated with the second motor;
   determining, by executing an instruction with the processor, a torque error based on the first shared torque value and the second shared torque value;
   determining, by executing an instruction with the processor, a first torque adjustment associated with the first motor based on the torque error and the target linear position;
   determining a second torque adjustment associated with the second motor based on the torque error and the target linear position;
   adjusting a first torque applied to the shaft from the first motor based on the determined first torque adjustment; and
   adjusting a second torque applied to the shaft from the second motor based on the determined second torque adjustment.

2. A method of claim 1, further including:
   calculating a target rotational speed based on linear position information associated with the shaft; and
   determining a first target torque value associated with the first motor based on the target rotational speed and a first rotational speed associated with the first motor.

3. A method of claim 2, wherein the linear position information includes the target linear position and an estimated linear position of the shaft based on the first rotational speed.

4. A method of claim 2, wherein the linear position information includes the target linear position and the measured linear position of the shaft.

5. A method of claim 2, further including modifying the first target torque value based on the first torque adjustment.

6. A method of claim 1, wherein the first sharing factor represents a first percentage of torque generated by the first motor and the second sharing factor represents a second percentage of torque generated by the second motor.

7. An apparatus comprising:
   a processor system;
   a sensor to measure a linear position of a shaft connected to an aerodynamic control surface; and
   a memory communicatively coupled to the processor system, the memory including stored instructions that enable the processor system to:
      calculate a first torque value based on first phase currents of a first motor that is directly coupled to the shaft;
      calculate a second torque value based on second phase currents of a second motor that is co-shafted onto the shaft with the first motor;
      determine a target linear position of the shaft based on the measured linear position;
      determine a first shared torque value based on the first calculated torque value and a first sharing factor associated with the first motor;
      determine a second shared torque value based on the second calculated torque value and a second sharing factor associated with the second motor;
      determine a torque error based on the first shared torque value and the second shared torque value;
      determine a first torque adjustment associated with the first motor based on the torque error and the determined target linear position;
      determine a second torque adjustment associated with the second motor based on the torque error and the determined target linear position;
      adjust a first torque applied to the shaft by the first motor based on the determined first torque adjustment; and
      adjust a second torque applied to the shaft by the second motor based on the determined second torque adjustment.

8. The apparatus of claim 7, wherein the instructions enable the processor system to:
   calculate a target rotational speed based on linear position information associated with the shaft; and
   determine a first target torque value associated with the first motor based on the target rotational speed and a first rotational speed associated with the first motor.

9. The apparatus of claim 8, wherein the linear position information includes the target linear position and an estimated linear position of the shaft based on the first rotational speed.

10. The apparatus of claim 8, wherein the linear position information includes the target linear position and the measured linear position of the shaft.

11. The apparatus of claim 8, wherein the instructions enable the processor system to modify the first target torque value based on the first torque adjustment.

12. The apparatus of claim 7, wherein the first sharing factor represents a first percentage of torque generated by the first motor and the second sharing factor represents a second percentage of torque generated by the second motor.

13. A tangible machine-readable storage medium comprising instructions that, when executed, cause a processor to at least:
- calculate a first torque value based on first phase currents of a first motor that is directly coupled to a shaft connected to an aerodynamic control surface;
- calculate a second torque value based on second phase currents of a second motor that is co-shafted onto the shaft with the first motor;
- determine a target linear position of a shaft based on a measured linear position of the shaft measured by a linear position sensor;
- determine a first shared torque value based on the first calculated torque value and a first sharing factor associated with the first motor;
- determine a second shared torque value based on the second calculated torque value and a second sharing factor associated with the second motor;
- determine a torque error based on the first shared torque value and the second shared torque value;
- determine a first torque adjustment associated with the first motor based on the torque error and the determined target linear position;
- determine a second torque adjustment associated with the second motor based on the torque error and the determined target linear position;
- adjust a first torque applied to the shaft by the first motor based on the determined first torque adjustment; and
- adjust a second torque applied to the shaft by the second motor based on the determined second torque adjustment.

14. The tangible machine-readable storage medium of claim 13 comprising instructions that, when executed, cause the machine to at least:
- determine a target rotational speed based on linear position information associated with the shaft; and
- determine a first target torque value associated with the first motor based on the target rotational speed and a first rotational speed associated with the first motor.

15. The tangible machine-readable storage medium of claim 14 comprising instructions that, when executed, cause the machine to at least determine the target rotational speed based on a comparison of the target linear position and an estimated linear position of the shaft, the estimated linear position based on the first rotational speed.

16. The tangible machine-readable storage medium of claim 14 comprising instructions that, when executed, cause the machine to at least modify the first target torque value based on the first torque adjustment.

17. The tangible machine-readable storage medium of claim 13 comprising instructions that, when executed, cause the machine to at least:
- determine the first sharing factor as a first percentage of torque generated by the first motor; and
- determine the second sharing factor as a second percentage of torque generated by the second motor.

18. The apparatus of claim 7, wherein the first and second motors are arranged in series along a length of the shaft.

19. The apparatus of claim 7, wherein the first and second motors are not coupled to a transmission or differential.

* * * * *